June 25, 1929.　　　H. F. PITCAIRN　　　1,718,577
AIRCRAFT DEVICE
Filed Dec. 12, 1925　　　2 Sheets-Sheet 1
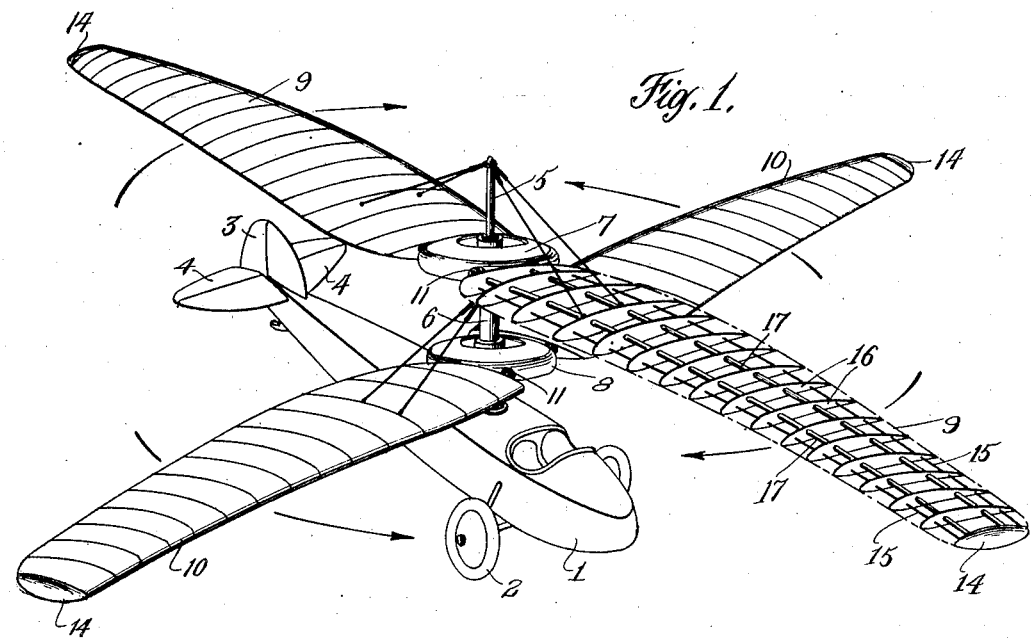
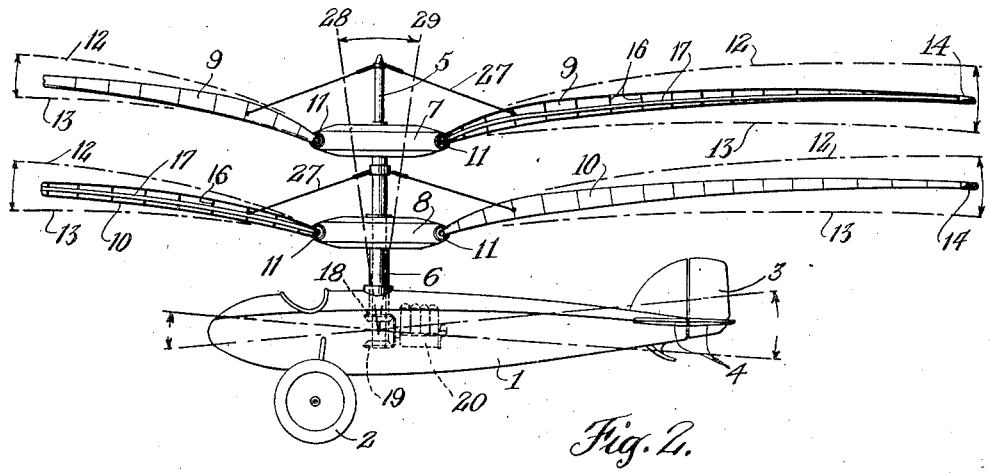
INVENTOR
Harold F. Pitcairn
BY Synnestvedt & Lechner
ATTORNEYS June 25, 1929.  H. F. PITCAIRN  1,718,577
AIRCRAFT DEVICE
Filed Dec. 12, 1925   2 Sheets-Sheet 2
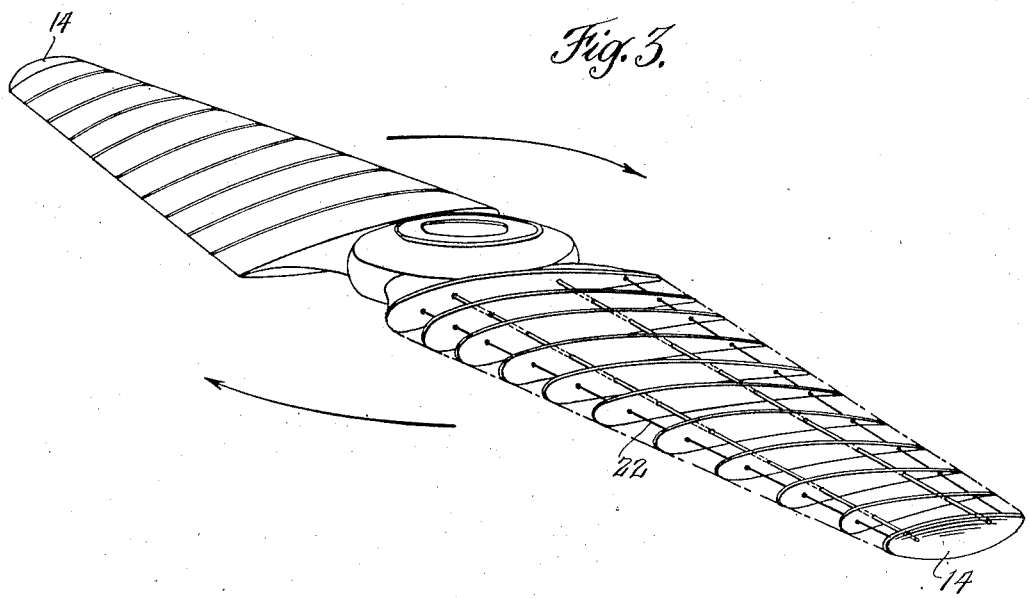
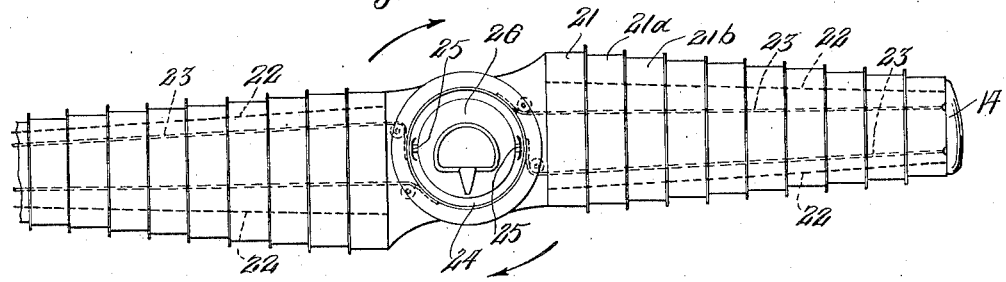
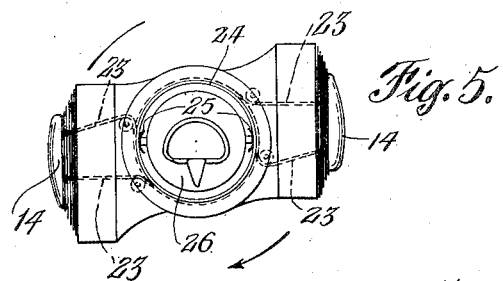
INVENTOR
Harold F Pitcairn
BY
Synnestvedt + Lechner
ATTORNEYS Patented June 25, 1929.

1,718,577

UNITED STATES PATENT OFFICE.

HAROLD F. PITCAIRN, OF BRYN ATHYN, PENNSYLVANIA.

AIRCRAFT DEVICE.

Application filed December 12, 1925. Serial No. 74,941.

This invention has reference to an improvement in aircraft devices, particularly such as have revolving wings or vanes driven by motive power or by other means such as the reaction of the air upon the wings, the longitudinal propelling force being otherwise supplied.

These revolving wings or vanes are driven by shafts which are approximately vertical but provided with means for tilting them as desired.

The first of the objects of my present invention is the provision of a device of the character specified in which I have arranged the wing so that it will be flexible and will at the same time be capable of support in position for operation by means of centrifugal force of the rotation in conjunction with the action of the air against it or a power driving mechanism which mechanism is preferably connected at or near the center of rotation.

A further object of the invention is the provision of an aircraft in which the several parts of which the wing is composed will be maintained in relative and operative position by centrifugal force.

A further object of my invention is the provision of means for taking care of the wing parts when centrifugal force is not operative as is the case when the rotative motion comes to an end.

In order that my improvement will be better understood, I will proceed to describe the same in connection with the accompanying drawings in which I have illustrated it in preferred form and in which Fig. 1 is a perspective view of a machine embodying my improvements;

Fig. 2 is a side elevation of the same;

Fig. 3 is a perspective view of one of the double wing members showing the arrangement of parts in one form of my flexible plane;

Fig. 4 is a plan view showing a modified form of the improvement with the several wing parts arranged to telescope one within the other; and Fig. 5 is a plan view showing the telescopic parts drawn into retracted position.

Referring now more particularly to Fig. 1 it will be seen that I have therein indicated at 1 the fuselage of an airplane device provided with wheels 2 and a vertical rudder 3 and horizontal elevator 4.

Extending upwardly from the fuselage 1 I provide an arrangement of driving shafts, one of which, 5 projects upward thru another one 6, which latter is tubular in form. Attached to the shaft 5 is a hub 7 for driving a pair of wings 9 while attached to the shaft 6 is a hub 8 arranged to drive another pair of wings 10 in an opposite direction.

The wings may be pivotally carried by the hubs as indicated at 11 or if preferred may be rigidly secured to the hubs as I provide them with a certain degree of flexibility giving them a movement between the two lines 12 and 13 in Fig. 2, the parts being held in operative position during rotation by means of the centrifugal force which is augmented by the weight 14 placed at the tip of the wing and secured by the retaining cord 15 which in the structure shown in Fig. 1 passes thru the ribs 16, there being a somewhat flexible additional support provided in the arrangement of Fig. 1 by the use of rods 17 which may be of bamboo or flexible steel tubing, the purpose of these rods being in this arrangement to keep the tips of the wings from sagging too much when they are not rotating.

As indicated in Fig. 2 it will be seen that I have provided a bevelled gear 18 for driving the shaft 6 on which is mounted the lower wing or plane and another bevelled gear 19 for driving the shaft 5 on which is mounted the plane constituting the upper pair of wings 9. Both of these bevelled gears receive motion from the power device or motor 20.

Referring to Figs. 4 and 5 it will be seen that I have therein shown a flexible wing composed of a plurality of telescopically disposed parts 21, 21$^a$, 21$^b$ etc., these being held by the cord 22 in operative position as shown in Fig. 4 when the weights 14 are pulling outward by the action of centrifugal force. The arrangement shown in these Figures 4 and 5 is provided with retraction cords 23 constructed to be wound around a drum 24 when the latter is caused to stop rotating by setting out the shoes 25 which exert frictional resistance such as will utilize the momentum of the revolving motion of the wing parts in wrapping the cords 23 around the drum as the result of which the wings when the machine comes to rest are drawn into the position shown in Figure 5. The part 26 is stationary, the other parts revolving around it and the drum 24, when its rotation is stopped, acts to wind up the cords 23 only when the shoes 25 are thrown into action by some suitable mechanism, not shown in detail.

If the wings are semi-flexible I may provide as a supplemental means for carrying the weight of the wings or planes when not rotating elastic cords such as indicated at 27. If the wings are fully flexible this will not apply.

It will be observed that while the weight of the wings themselves together with the tip weight 14 will act to provide a centrifugal strain that will hold the parts in operative position during rotation, pulling on the cords 15, any gyroscopic effect of the apparatus will be neutralized by one of the pairs of wings revolving in a direction opposite to the other.

On Fig. 2 I have indicated by the lines 28 and 29 a degree of tilting movement of the vertical driving shaft which may be obtained thru proper manipulation of the elevator vanes the effect being where the machine is tilted in a direction of the line 28 to move the plane forward. As the vertical axis approaches the line 29 the tendency will be, of course, to arrest the forward movement, as in landing.

It will be observed that the forces exerted by the air will cause the parts to flex with relation to each other, the weight acting thru centrifugal action to hold the assembled units in operative position.

I claim:—

1. A rotatively mounted longitudinally flexible wing for aircraft which is held in operative position by the centrifugal force of its rotative movement.

2. An improvement in aircraft devices comprising a longitudinally flexible wing mounted for rotation, and power mechanism for rotating said wing connected at or near its center of rotation.

3. An improvement in aircraft devices comprising in combination a longitudinally flexible wing constructed to be held in operative position by centrifugal force, and power driving means for actuating said wing.

4. An improvement in aircraft devices comprising in combination a flexible wing, means for driving said wing, and weights whereby the rotative movement of the wing holds it in operative position.

5. An improvement in aircraft devices comprising in combination a flexible wing, means associated therewith for restraining centrifugal force and power mechanism for actuating said wing.

6. In an aircraft device a rotatably mounted wing free to flex longitudinally from its normal operating form by the action of the air upon it.

In testimony whereof, I have hereunto signed my name.

HAROLD F. PITCAIRN.